United States Patent
Takekawa (10) Patent No.: US 7,718,292 B2
(45) Date of Patent: May 18, 2010

(54) FUEL CELL STACK AND MANUFACTURING METHOD THEREOF

(75) Inventor: Toshihiro Takekawa, Yokosuka (JP)

(73) Assignee: Nissan Motor Co. Ltd., Kanagawa (JP)

( * ) Notice: Subject to any disclaimer, the term of this patent is extended or adjusted under 35 U.S.C. 154(b) by 728 days.

(21) Appl. No.: 10/927,154

(22) Filed: Aug. 27, 2004

(65) Prior Publication Data

US 2005/0048358 A1  Mar. 3, 2005

(30) Foreign Application Priority Data

Aug. 28, 2003  (JP)  ............................. 2003-209209

(51) Int. Cl.
*H01M 4/94* (2006.01)
(52) U.S. Cl. ........................................ 429/30; 29/623.5
(58) Field of Classification Search ................... 429/12, 429/30, 34, 35, 38, 39; 29/623.5
See application file for complete search history.

(56) References Cited

U.S. PATENT DOCUMENTS

| 2003/0175575 A1* | 9/2003 | Zuber et al. ................... 429/35 |
| 2003/0219645 A1* | 11/2003 | Reichert et al. ............... 429/42 |
| 2005/0173244 A1 | 8/2005 | Hayashi et al. |

FOREIGN PATENT DOCUMENTS

| EP | 1 445 881 A1 | 8/2004 |
| JP | 06-052864 | 2/1994 |
| JP | 07-078617 | 3/1995 |
| JP | 2001-185462 | 7/2001 |

(Continued)

OTHER PUBLICATIONS

European Search Report, Issued in Corresponding European Patent Application No. 04020302.8-1227, dated on Jul. 26, 2007.

(Continued)

*Primary Examiner*—Patrick Ryan
*Assistant Examiner*—Monique Wills
(74) *Attorney, Agent, or Firm*—McDermott Will & Emery LLP (57) ABSTRACT

A fuel cell stack constituted by fastening a laminated cell, is disclosed. The electrode of the cell has a catalyst electrode layer and a porous gas diffusion layer and supporting a polymer electrolyte membrane (1) from both sides. A separator (3) of the cell has a gas passage (6, 7) which supplies fuel gas or oxidizer gas to the gas diffusion layer. The gas diffusion layer (2b) is constituted such that when a load is applied and removed in the lamination direction of the cell, an amount of change in a thickness of the gas diffusion layer in a non-loaded state before and after the load is applied falls to or below a predetermined value. The gas diffusion layer (2b) is manufactured by repeating a cycle of applying and removing a load on the gas diffusion layer in the lamination direction of the cell before laminating the cell. The cycle is repeated until an amount of change in a thickness of the gas diffusion layer in a non-loaded state before and after the load is applied falls to or below a predetermined value. The gas diffusion layer (2b) is prevented from swelling into the gas passage.

14 Claims, 10 Drawing Sheets

FOREIGN PATENT DOCUMENTS

| | | | |
|---|---|---|---|
| JP | 2002-093424 | | 3/2002 |
| JP | 2002-343379 | * | 11/2002 |
| JP | 2002-343379 | A | 11/2002 |
| JP | 2002-352807 | | 12/2002 |
| WO | WO 03/034519 | A1 | 4/2003 |
| WO | WO 03/052884 | | 6/2003 |

OTHER PUBLICATIONS

Japanese Office Action issued in Japanese Patent Application No. JP 2003-209209, mailed Mar. 24, 2009.

* cited by examiner

FUEL CELL STACK AND MANUFACTURING METHOD THEREOF

TECHNICAL FIELD OF THE INVENTION

This invention relates to a fuel cell stack which uses a polymer electrolyte membrane.

BACKGROUND OF THE INVENTION

A fuel cell converts chemical energy contained in fuel directly into electric energy by causing a fuel gas such as hydrogen and an oxidizer gas such as air to react electrochemically. One type of fuel cell is a polymer electrolyte fuel cell (PEFC), which uses a polymer electrolyte as an electrolyte.

The electrochemical reaction which takes place in the fuel electrode and oxidizer electrode is as follows.

Fuel electrode: $2H_2 \rightarrow 4H^+ + 4e^-$  (1)

Oxidizer electrode: $4H^+ + 4e^- + O_2 \rightarrow 2H_2O$  (2)

In order to produce a favorable reaction in both the fuel electrode and oxidizer electrode, reaction gas (fuel gas and oxidizer gas) must be supplied evenly to a reaction surface (i.e. the surface of the electrolyte membrane. To supply reaction gas to the reaction surface evenly, ease of gas flow in a gas passage formed in the cell and ease of gas diffusion inside a gas diffusion layer must be ensured.

The gas diffusion layer is disposed in contact with a separator, in which a passage allowing gas flow is formed. More specifically, the gas diffusion layer contacts a rib defining the passage in the separator. A fuel cell stack is typically fastened together in the lamination direction by bolts or bands, and hence the gas diffusion layer receives a load (or pressure) from the rib of the separator. The region of the gas diffusion layer which contacts the rib and is subjected to a load from the rib is known as a compressed region (or rib-contacting part). A non-compressed region (or gas diffusion portion) of the gas diffusion layer which faces the passage in the separator does not receive the stack-fastening load (i.e. pressure from the rib) that is received by the compressed region. Hence the non-compressed region which faces the passage swells toward the passage side. As a result, the cross-sectional area of the passage decreases, inhibiting the gas flow through the passage, and swelling of the gas diffusion layer toward the gas passage must therefore be suppressed.

Furthermore, to ensure that the reaction within the reaction surface is even, a sufficient gas diffusivity is required not only in the non-compressed region, but also in the compressed region. The gas diffusivity differs within the gas diffusion layer according to the state of compression. Since the state of compression differs between the non-compressed region and compressed region, a difference arises in the gas diffusivity of the two regions. It is therefore desirable that the gas diffusivity be as uniform as possible in the non-compressed region and the compressed region.

Tokkai 2002-343379, published by the Japan Patent Office in 2002, discloses a technique of regulating the gas diffusivity within the gas diffusion layer. By pressing the gas diffusion layer in the direction of thickness during manufacture, the gas diffusivity within the gas diffusion layer is regulated to a design value.

SUMMARY OF THE INVENTION

In this prior art, however, attention is paid only to the gas diffusivity within the gas diffusion layer, and swelling in the gas diffusion layer toward the passage is not taken into consideration. Hence the problem of obstructions to the gas flow through the gas passage remains unsolved. If the problem were to be solved by increasing the gas flow, pressure loss within the cell would increase, leading to an increase in energy loss.

An object of this invention is to regulate the characteristic of a gas diffusion layer provided in a cell to an optimum condition, and thereby achieve uniformity in the gas diffusivity within a reaction surface while preventing adverse effects on a gas passage.

In order to achieve the above object, this invention provides a fuel cell stack constituted by fastening a laminated cell. The cell comprises a membrane electrolyte assembly having a polymer electrolyte membrane and two electrodes. Each electrode comprises a catalyst electrode layer and a porous gas diffusion layer and supports the polymer electrolyte membrane from both sides. The cell further comprises a separator comprising a gas passage which supplies fuel gas or oxidizer gas to the gas diffusion layer. The gas diffusion layer of at least one electrode is constituted such that when a load is applied and removed in the lamination direction of the cell, an amount of change in a thickness of the gas diffusion layer in a non-loaded state before and after the load is applied falls to or below a predetermined value.

This invention further provides a manufacturing method for a fuel cell stack constituted by fastening a laminated cell. The manufacturing method for a fuel cell stack comprises the steps of repeating a cycle of applying and removing a load on the gas diffusion layer in the lamination direction of the cell before laminating the cell; and laminating the cells, and then fastening the laminated cells. The cycle is repeated until an amount of change in a thickness of the gas diffusion layer in a non-loaded state before and after the load is applied falls to or below a predetermined value.

The details as well as other features and advantages of this invention are set forth in the remainder of the specification and are shown in the accompanying drawings.

PREFERRED EMBODIMENTS OF THE INVENTION

Figure 1:
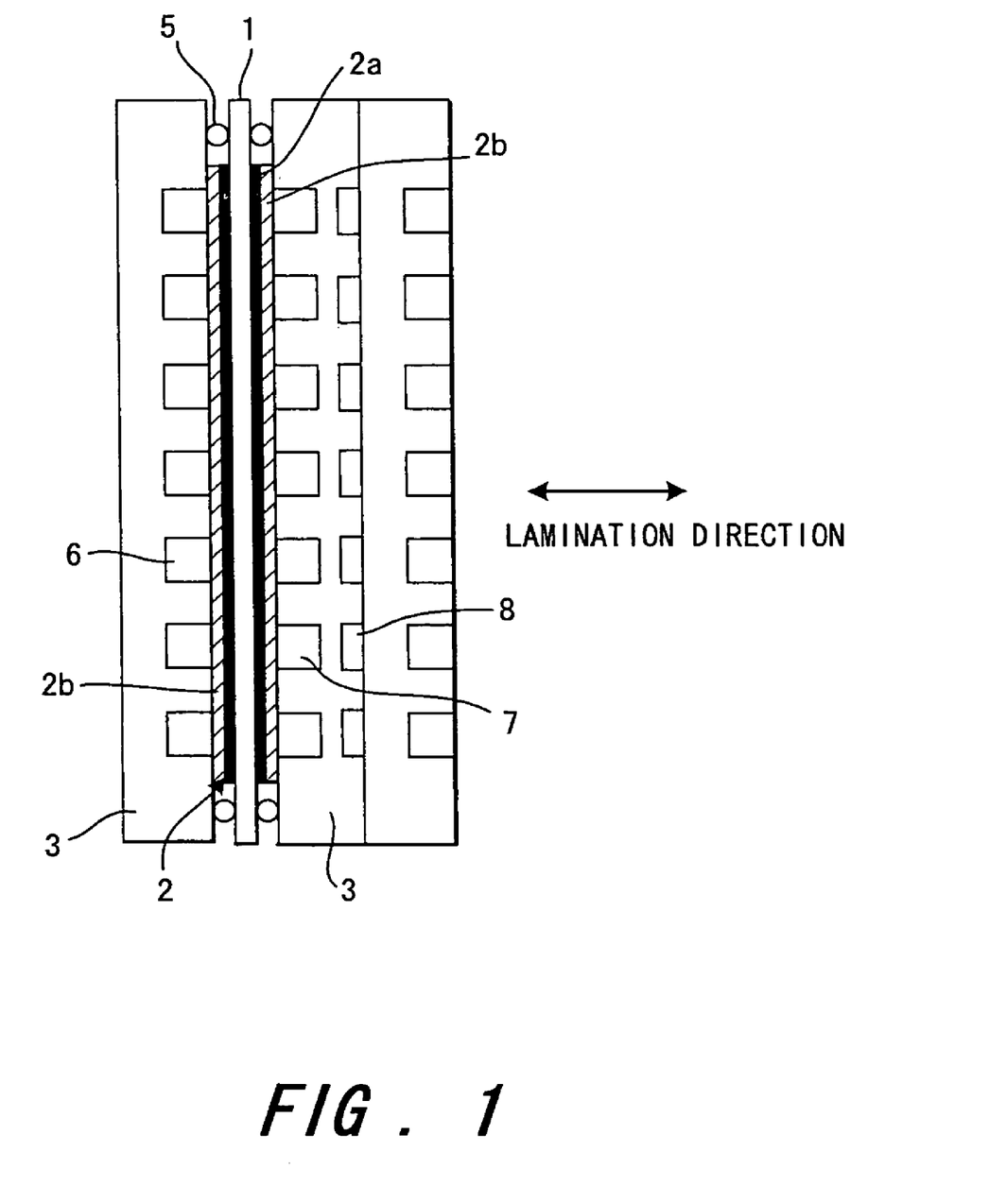
FIG. 1 is a schematic sectional view showing the constitution of a fuel cell stack to which this invention is applied.

FIG. 1 is a sectional view showing the constitution of a polymer electrolyte fuel cell stack of this invention. The fuel cell stack is constituted by laminating a plurality of single cells. The fuel cell stack is fastened in the lamination direction by bolts or bands, for example.

A single cell is constituted by a membrane electrolyte assembly (MEA) and a separator 3. The MEA comprises a polymer electrolyte membrane 1, and two electrodes (a fuel electrode and an oxidizer electrode) 2 disposed on either side of the electrolyte membrane 1. The electrodes 2 are constituted by a catalyst electrode layer 2a on which a catalyst is carried, and a gas diffusion layer 2b. The separator 3 comprises a gas passage, through which fuel gas and oxidizer gas are supplied to the electrodes 2 to generate power, and a cooling water passage, through which a refrigerant for cooling the stack flows. Two of the separators 3 sandwich the membrane electrolyte assembly (MEA). More precisely, the gas passage 6 is defined by the electrode 2 and the body of the separator 3.

Sealing members 5 are provided between the separator 3 and electrolyte membrane 1 so as to face the electrodes 2. The sealing members 5 are positioned on the outer edge parts of the separator 3. The sealing members 5 prevent fuel gas containing hydrogen, oxidizer gas containing oxygen, and refrigerant (e.g. cooling water) from leaking outside.

The electrolyte membrane 1 is formed from a solid polymer material such as a fluororesin, and has a proton conducting property. The two catalyst electrode layers 2a disposed on each surface of the electrolyte membrane 1 are formed from carbon black comprising a catalyst that is constituted by platinum and/or another metal. The gas diffusion layer 2b is formed from a porous material having gas transmissivity (i.e. gas diffusivity). The material of the gas diffusion layer 2b is either carbon cloth or carbon paper. Commercially available carbon cloth or carbon paper may be used.

The separator 3 is formed from a molded carbon material having gas impermeability. A large number of grooves corresponding to fuel gas and oxidizer gas passages 6, 7 are formed on one or both surfaces of the separator 3.

A refrigerant passage 8 for removing the heat that is generated from the fuel cell itself is provided in the separator 3 on the oxidizer electrode side. The refrigerant passage 8 does not necessarily have to be disposed in each cell, but it is desirable that as many as possible be provided.

Oxidizer gas and fuel gas are supplied to each fuel cell from their respective gas inlets, and after contributing to power generation, are exhausted from gas outlets.

Figure 2:
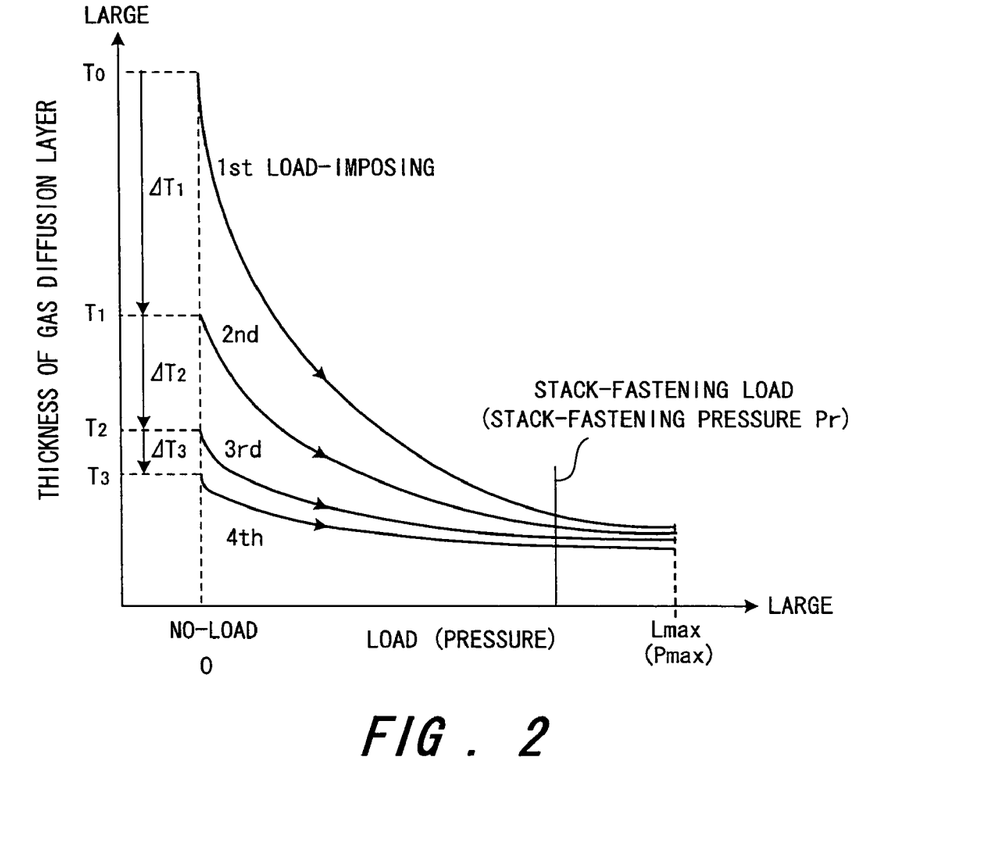
FIG. 2 is a graph showing the relationship between a load (pressure) applied to a gas diffusion layer and the thickness of the gas diffusion layer.

FIG. 2 shows change in the thickness of the gas diffusion layer 2b when a load (in other words, pressure) is applied repeatedly to the gas diffusion layer 2b in the lamination direction of the stack during manufacture. The load is applied up to a maximum value Lmax, and then released. For example, the maximum load value Lmax is 3 MPa. The thickness of the gas diffusion layer decreases in accordance with the load, and recovers to a certain extent when the load is removed. However, the thickness of the gas diffusion layer decreases by an amount of thickness change ($\Delta T$) corresponding to the plastic deformation which occurs during a single cycle of load application and removal. When the load is applied repeatedly to an unprocessed gas diffusion layer 2a, the thickness thereof changes repeatedly in accordance with the plastic deformation. As the number of repeated load applications increases, the thickness of the gas diffusion layer 2b converges at a fixed thickness and stops changing even when the load is applied, and hence the amount of change (or rate of change) in the thickness caused by load application decreases.

By repeating the cycle of load application and removal on the gas diffusion layer 2b a plurality of times, the amount of change (Dn) in the thickness of the gas diffusion layer 2b during load application decreases such that the gas diffusion layer 2b becomes durable in relation to loads. As a result, the amount of change in the thickness of the gas diffusion layer 2b (or swelling toward the gas passage side) caused by the application of a load is suppressed during fastening of the stack in particular. Moreover, irregularities in the thickness of the gas diffusion layer 2b in each of the cells are suppressed even when pressure irregularities occur among the cells as a result of stack fastening.

Figure 3A:
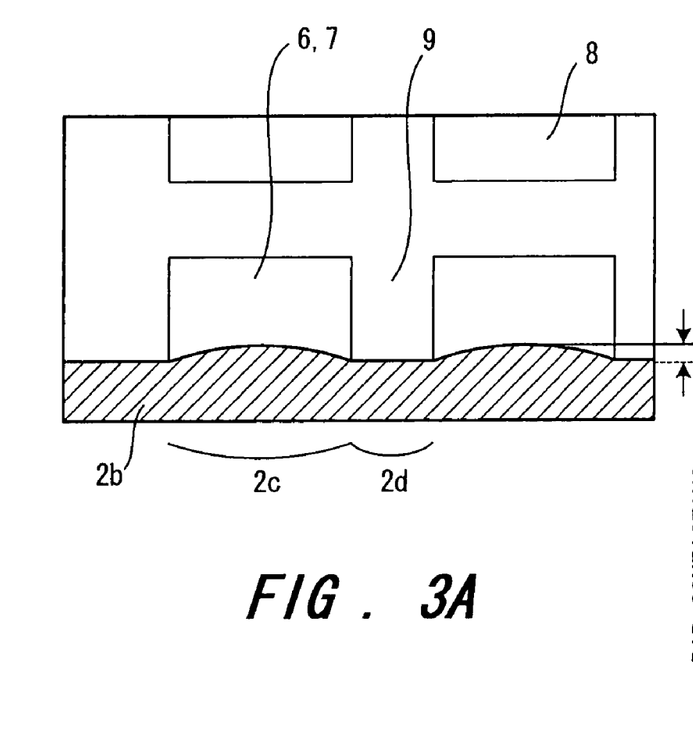
FIG. 3A is an enlarged sectional view of the gas diffusion layer and a gas passage.
Figure 3B:
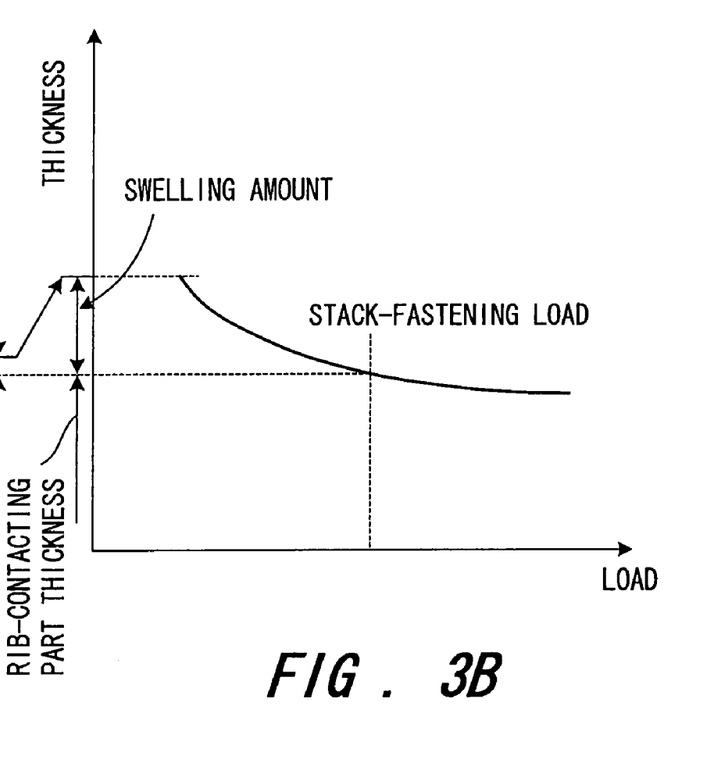
FIG. 3B is a graph showing the relationship between the thickness of the gas diffusion layer and a load (pressure) applied in a stack lamination direction.

FIG. 3A shows a schematic cross section of the gas passages 6, 7 and gas diffusion layer 2b in the stack lamination direction. FIG. 3B shows change in the thickness of the gas diffusion layer 2b in relation to a load in the stack fastening direction, in other words, pressure on the gas diffusion layer from the separator. A gas diffusion part 2c (non-compressed region) of the gas diffusion layer 2b, which faces the gas passages 6, 7, receives less stack fastening pressure than a rib-contacting part 2d (compressed region) which contacts a rib 9. Hence the thickness of the gas diffusion part 2c undergoes substantially no change when the load is applied, and as a result, the gas diffusion part 2c takes a form which swells toward the gas passage side.

As shown in FIG. 2, however, the rate of change in the thickness of the gas diffusion layer 2b upon the application of a load during stack fastening is suppressed to a low level by repeatedly applying a load to the gas diffusion layer 2b in the lamination direction during manufacture. Hence swelling of the gas diffusion part 2c toward the gas passages 6, 7 is suppressed, enabling the sectional area of the gas passages 6, 7 to be largely ensured. As a result, the gas flow property can be ensured, and reductions in the generation efficiency of the fuel cell stack can be prevented.

Figure 4:
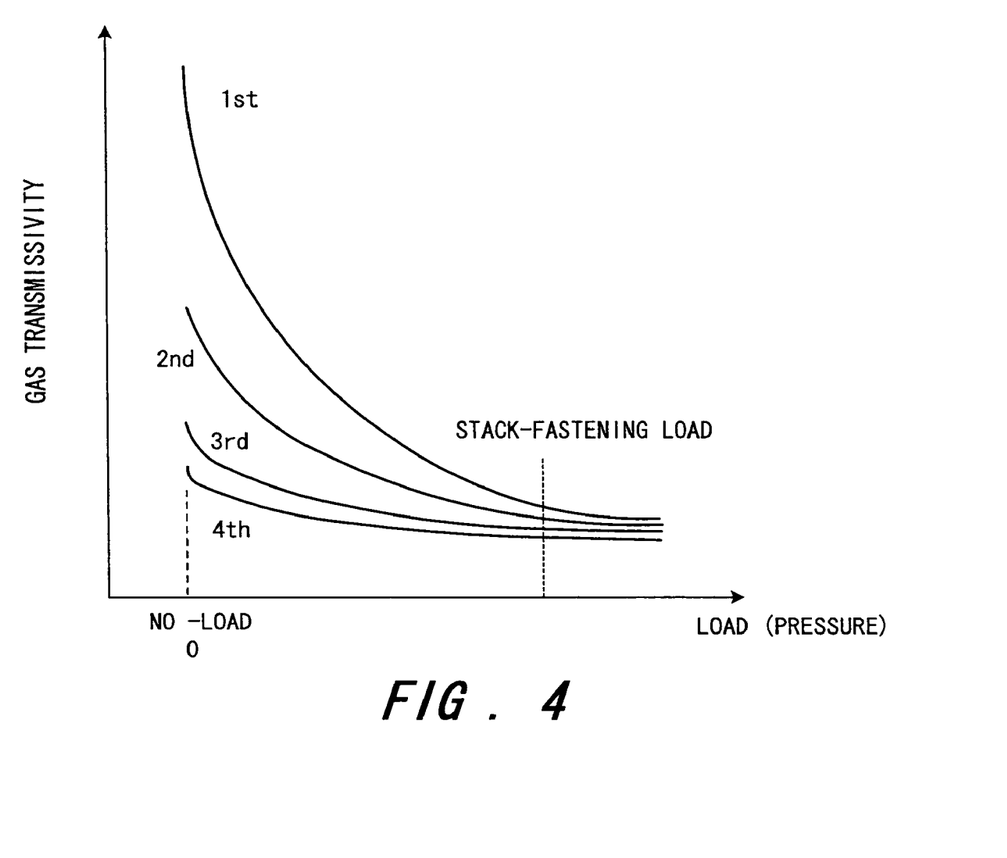
FIG. 4 is a graph showing the relationship between the load (pressure) applied to the gas diffusion layer and the gas transmissivity of the gas diffusion layer.

FIG. 4 shows the relationship between the load (surface pressure) on the gas diffusion layer 2b and the gas transmissivity or diffusivity. Here, similarly to the thickness of the gas diffusion layer shown in FIG. 2, the gas transmissivity through the gas diffusion layer decreases gradually in accordance with the repeated application of the load. As the number of cycles is increased, the gas transmissivity converges at a predetermined value, and the pattern of change in the gas transmissivity converges into a fixed pattern. By applying the load repeatedly, the difference in gas transmissivity under a non-loaded condition and a loaded condition contracts gradually, and thus the difference in gas transmissivity between the gas diffusion part 2c and the rib-contacting part 2d is suppressed. In so doing, gas transmissivity to the catalyst electrode layer 2a worsens slightly, but the concentration of the diffused gas becomes uniform over the reaction surface, which is perpendicular to the lamination direction.

Figure 5:
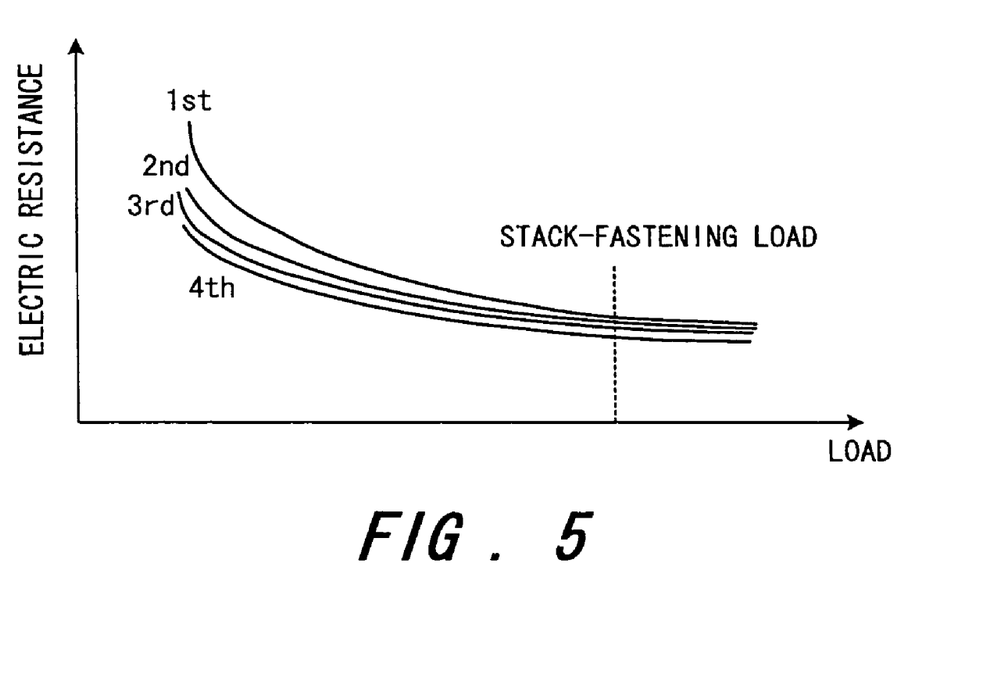
FIG. 5 is a graph showing the relationship between the load (pressure) applied to the gas diffusion layer and the electric resistance of the gas diffusion layer.

FIG. 5 shows the relationship between the load on the gas diffusion layer 2b and the electric resistance. The electric resistance of the gas diffusion layer 2b is measured using a four-terminal method by disposing electrodes on each side of the gas diffusion layer 2b. As the load increases, the electric resistance of the gas diffusion layer 2b decreases, and then converges at a fixed value. Similarly to the thickness of the gas diffusion layer in FIG. 2 and the gas transmissivity in FIG. 4, the electric resistance converges at a fixed value when the load is applied repeatedly. By applying the load repeatedly in this manner, the electric resistance of the gas diffusion layer 2b can be reduced. Moreover, the rate of change in the electric resistance value is greatly reduced by load application, and hence resistance irregularities in the cell lamination direction, occurring in the gas diffusion layer 2b within the perpendicular surface to the lamination direction, are suppressed to a low level.

Figure 6:
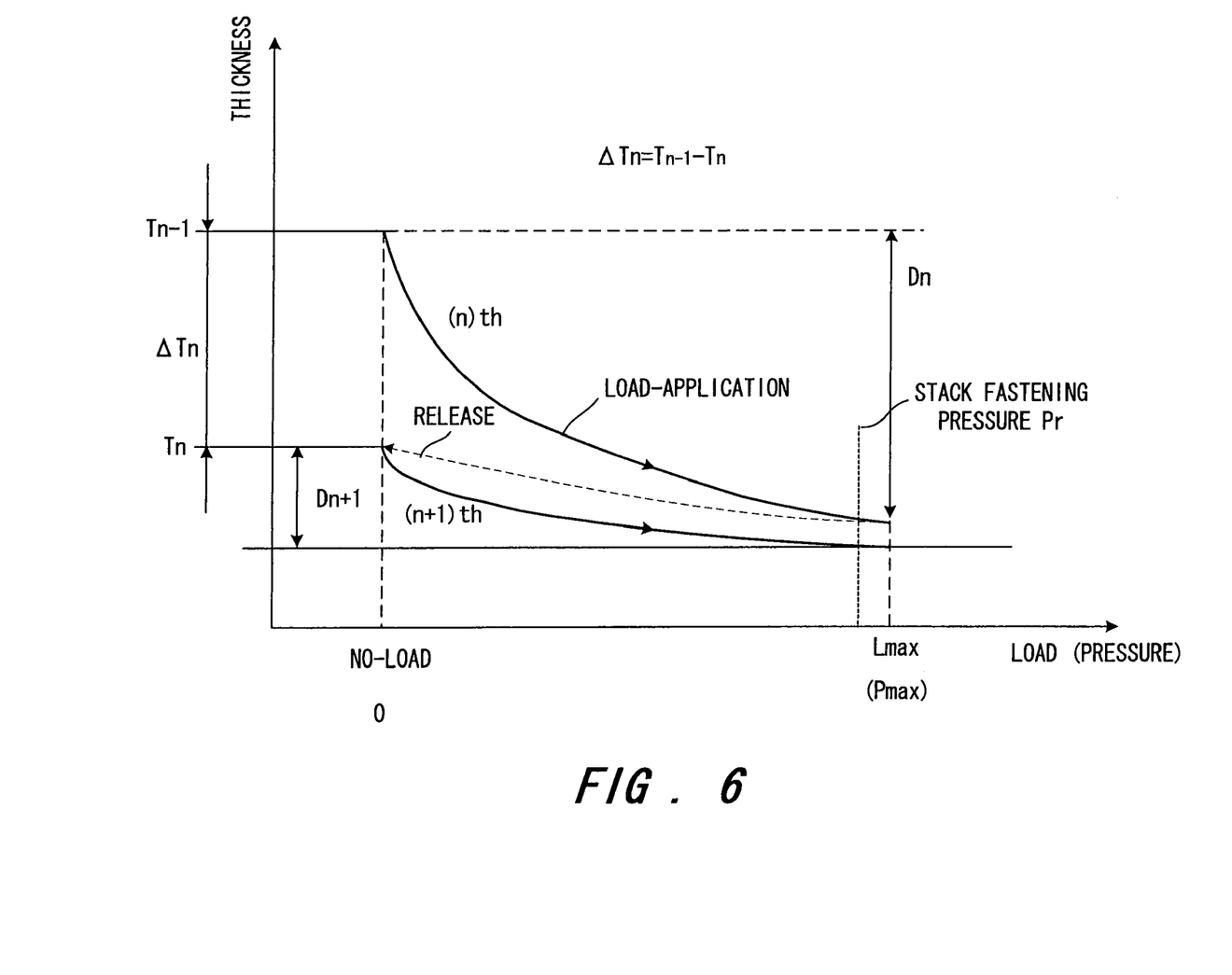
FIG. 6 is a graph showing the relationship between the load (pressure) applied to the gas diffusion layer and the thickness of the gas diffusion layer.

Referring to FIG. 6, the preferred number of repeated load applications onto the gas diffusion layer 2b during manufacture will be described. The thickness ($T_n$ and $T_{n-1}$) of the gas diffusion layer 2b in a non-loaded state following the (n−1)th load application and the nth load application are compared (n=an arbitrary natural number). The thickness of the gas diffusion layer 2b following the (n−1)th load application and removal cycle is expressed by $T_{n-1}$, and the thickness of the gas diffusion layer 2b following the nth load application and removal cycle is expressed by $T_n$. During manufacture of the gas diffusion layer, the load application and removal cycle is repeated until the rate of change in the thickness of the gas diffusion layer 2b before and after load application (or the difference in thickness $\Delta T_n = T_{n-1} - T_n$) falls to or below a predetermined value. The rate of change is defined as $\Delta T_n/T_{n-1} \times 100(\%)$. As shown in FIG. 2, the thickness of the gas diffusion layer 2b converges at a fixed value as the load increases, and it is therefore preferable to compare the thickness during the non-loaded period before and after one load application in order to ascertain the change in thickness. The thickness may be measured in micrometers. A feature of the manufactured gas diffusion layer is that when a load (in particular, a load equal to or less than the maximum value Lmax) is applied and removed in the lamination direction, the rate of change in the thickness of the gas diffusion layer during the non-loaded period before and after load application falls to or below a predetermined value.

Typically, a maximum pressure Pmax corresponding to the maximum load value Lmax is set to be greater than a pressure Pr which would presumably be produced in the rib-contacting part 2d when the stack is fastened. In this case, it is presumed that if the stack fastening pressure Pr produced by stack fastening were applied to and removed from the manufactured gas diffusion layer, the rate of change in the thickness of the gas diffusion layer in a non-loaded state before and after application of the pressure would be no greater than the predetermined value.

It is to be noted that a rate of thickness change $D_n/T_{n-1} \times 100(\%)$ during load application may be used as a target for the change in thickness before and after load application, instead of $\Delta T_n/T_{n-1} \times 100(\%)$. In other words, the load application and removal cycle may be repeated until the rate of thickness change $D_n/T_{n-1}$ during load application falls to or below the predetermined value. Here, $D_n$ is the difference between the thickness ($T_{n-1}$) at zero load and the thickness at the maximum load Lmax during the nth load application.

When the gas diffusion layer 2b is constituted by a type of carbon paper, the change in thickness from the first to the second load application is comparatively large, but change caused by subsequent load application is small. Hence the predetermined value for the rate of thickness change in the gas diffusion layer 2b constituted by a type of carbon paper may be comparatively large. Here, the predetermined value for the rate of change ($\Delta T_n/T_{n-1} \times 100\%$) is preferably less than 10%, and more preferably less than 5%. In an experiment, the rate of change ($\Delta T_n/T_{n-1} \times 100\%$) fell below 5% after applying twice the load of 3 MPa.

When the gas diffusion layer 2b is constituted by a type of carbon cloth, on the other hand, change in the thickness of the gas diffusion layer in relation to load application does not decrease unless the load is applied several times. Hence the predetermined value for the rate of change is preferably set low. The predetermined value for the rate of change ($\Delta T_n/T_{n-1} \times 100\%$) in the gas diffusion layer 2b constituted by a type of carbon cloth is preferably less than 5%, and more preferably less than 3%. In an experiment, the rate of change ($\Delta T_n/T_{n-1} \times 100\%$) fell below 3% after applying 6-times the load of 3 MPa.

A typical method of assembling the membrane electrolyte assembly comprises a step of disposing the two catalyst electrode layers 2a on each side of the electrolyte membrane 1, a step of sandwiching the electrolyte membrane 1 and the two catalyst electrode layers 2a between the gas diffusion layers 2b from the two outside surfaces of the catalyst electrode layers 2a, and a step of hot-pressing all of the electrolyte membrane 1, catalyst electrode layers 2a, and gas diffusion layers 2b.

A method of manufacturing the membrane electrolyte assembly of this invention comprises a step of applying a load repeatedly to the gas diffusion layer 2b alone before assembling the membrane electrolyte assembly. The gas diffusion layer 2b is cut corresponding to the size of the planned membrane electrolyte assembly, and then a load is applied to the gas diffusion layer 2b repeatedly before the membrane electrolyte assembly is assembled by the typical method described above.

Figure 7:
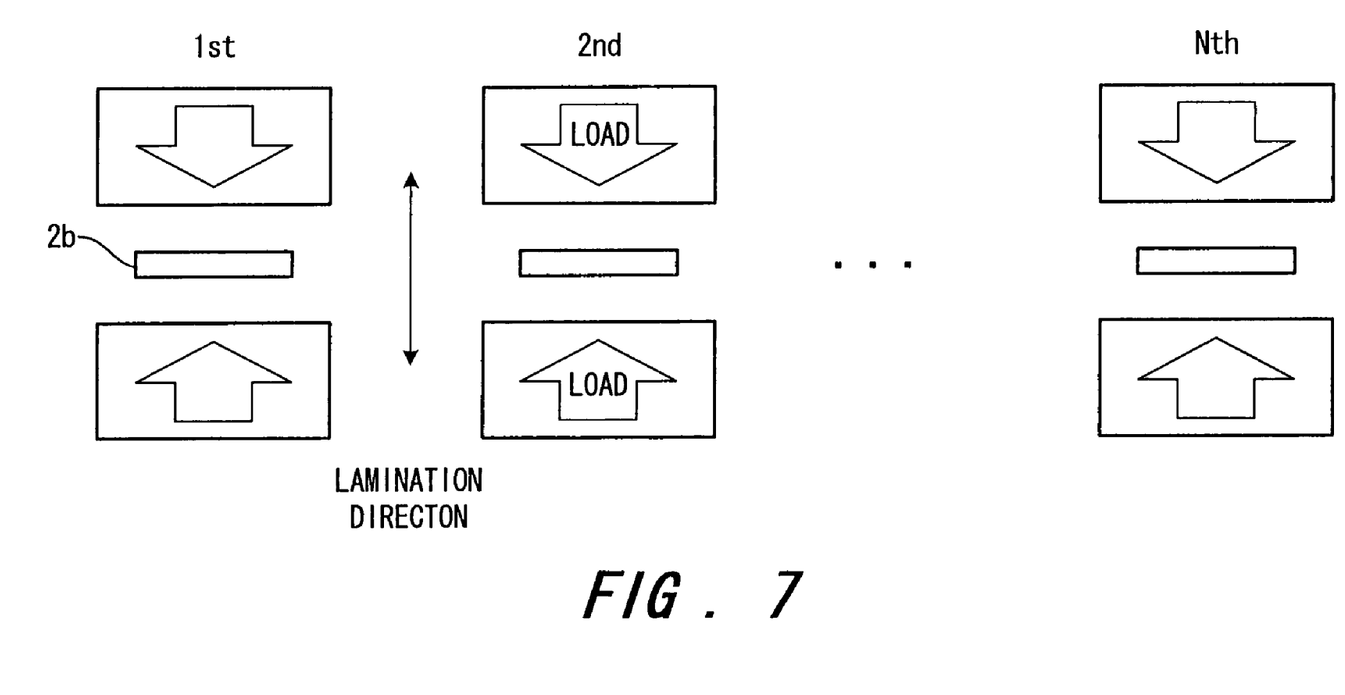
FIG. 7 is a diagram illustrating a manufacturing method of the gas diffusion layer.

As shown in FIG. 7, one method of applying a load to the gas diffusion layer 2b involves applying the load batchwise. This can be achieved by performing batch processing of the gas diffusion layer 2b intermittently, as shown in FIG. 7. Having been subjected to repeated load application, the gas diffusion layer 2b is used to assemble the electrolyte membrane assembly.

Figure 8:
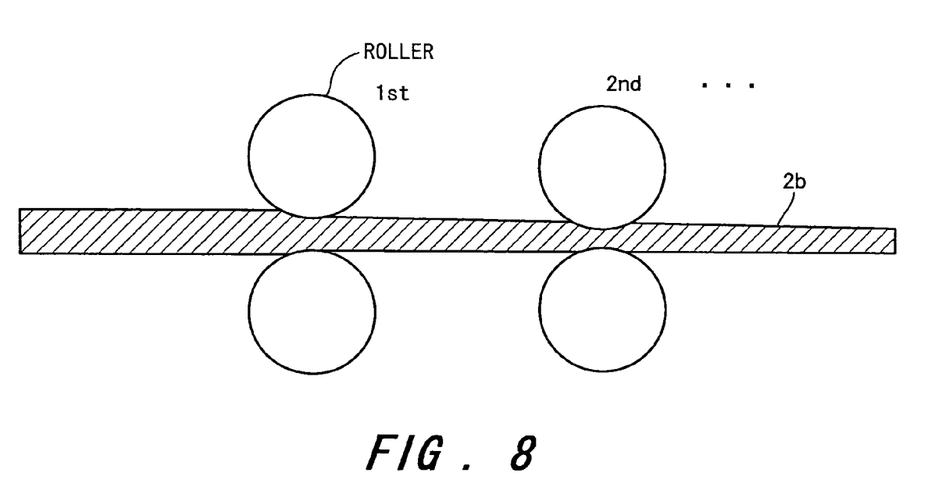
FIG. 8 is a diagram illustrating another manufacturing method of the gas diffusion layer.

As shown in FIG. 8, another method of applying a load to the gas diffusion layer 2b involves rolling the gas diffusion layer 2b. By providing a plurality of roller presses in a pressing process, the load can be applied to the gas diffusion layer 2b repeatedly.

According to this invention, the maximum value Pmax of the pressure that is produced during application of a load on the gas diffusion layer 2b during manufacture is set to be greater than the stack-fastening pressure Pr to be applied to the rib-contacting part 2d of the gas diffusion layer 2b from the separator during stack fastening. In so doing, the thickness of the gas diffusion layer 2b can be adjusted to the design thickness of the gas diffusion layer 2b during stack fastening. In this case, a large load is applied, and hence the load can be applied effectively with a comparatively small number of applications. Moreover, since the applied pressure is larger than the pressure required for fastening the stack, creeping of the gas diffusion layer 2b following stack fastening can be suppressed.

However, in exceptional cases when the stack-fastening pressure Pr is close to a pressure which would cause the gas diffusion layer 2b to buckle, the maximum pressure value Pmax is set to be lower than the stack-fastening pressure Pr. In this case, the number of repeated load applications increases, but the physical properties of the gas diffusion layer 2b (for example, the gas diffusion layer thickness, the gas transmissivity through the gas diffusion layer, and the electric resistance) can be controlled more precisely. Further, by applying a smaller load than the buckling load of the material (carbon cloth, carbon paper, and so on) constituting the gas diffusion layer 2b, damage to the gas diffusion layer 2b can be prevented.

When a load is applied repeatedly to the gas diffusion layer 2b, a cold press may be used. Alternatively, the load may be applied after heating the gas diffusion layer 2b in advance. Particularly when a resin or the like which serves as a binding agent for binding the carbon fiber material forming the gas diffusion layer 2b is present within the gas diffusion layer, the bond between the binding agent and the carbon fibers can be reconstituted through heating. As a heating condition, the temperature of the gas diffusion layer 2b is preferably no less than 80° C. and no more than 350° C., and more preferably no less than 120° C. and no more than 250° C.

It should be noted that above, description mainly focussed on a case in which a load is applied repeatedly to the gas diffusion layer 2b alone. However, it goes without saying that a load may be applied to the membrane electrolyte assembly after manufacture.

The gas diffusion layer 2b, in which the amount of change caused by repeated load application has converged within the predetermined value, may be used only on the cathode side since the width of the passage facing the separator 3 is large on the cathode side. By means of such a constitution, swelling of the gas diffusion layer 2b into the gas passage, which is likely to occur on the cathode side where the passage is wide, can be prevented. Reductions in the sectional area of the passage caused by swelling of the gas diffusion layer 2b can also be prevented in the entire stack.

Moreover, by using the gas diffusion layer 2b having decreased gas transmissivity on at least the cathode side, uniform gas diffusion can be obtained on the cathode side. The gas diffusivity of air, which serves as the cathode gas, deteriorates in the interior of the gas diffusion layer 2b to a greater degree than the hydrogen which serves as the anode gas, but by reducing the gas transmissivity, the amount of gas circulating in the rib-contacting part 2d can be increased, enabling gas to be supplied to the electrolyte membrane 1 evenly.

Next, referring to FIGS. 9 and 10, a second embodiment will be described. In the second embodiment, surface processing is implemented after forming the gas diffusion layer 2b characterized by the rate of thickness change under load being limited within the predetermined value. In the following, each step of a method for manufacturing a gas diffusion layer of the second embodiment will be described in sequence.

In a first step, as described in the first embodiment, a load is applied repeatedly to the gas diffusion layer 2b. As noted above, the number of repetitions may be decreased depending on the load application time, enabling a reduction in cost. The optimum length of time for a single load application is selected in accordance with the tact time of the step.

Next, in a second step, predetermined surface processing or surface coating is performed on the gas diffusion layer 2b. Water repellent processing is typically selected as the surface processing. However, hydrophilic processing may be selected, depending on the design concept of the stack or the operating conditions of the fuel cell.

When water repellent processing is performed on the gas diffusion layer 2b, water produced by condensation and electrochemical reactions within the catalyst electrode layer 2a and gas diffusion layer 2b can be removed easily. This enables an improvement in the distribution of reaction gas through the gas diffusion layer in the cells on the end portions of the stack and in the vicinity of the gas passage at the outlet side of the cell, where water produced by condensation and electrochemical reactions is likely to accumulate.

When hydrophilic processing is performed on the gas diffusion layer 2b, the electrolyte membrane 1 can be prevented from drying out. As a result, the moisture retention property of the electrolyte membrane 1 can be secured, and proton conductivity within the electrolyte membrane, which is necessary for power generation, can be sufficiently secured. This is effective on the upstream side of the gas passage, for example, where the electrolyte membrane 1 tends to dry out easily.

Water repellent processing will be described below. First, the gas diffusion layer 2b is submerged in a water repellent processing liquid, and then the gas diffusion layer 2b is removed from the processing liquid and dried. As a result of this processing, the gas diffusion layer 2b becomes surface-processed.

A water repellent processing liquid that is in general use may be used in the water repellent processing. Examples of the water repellent processing liquid include a fluororesin aqueous dispersion which includes fluororesin dispersed in an aqueous dispersion medium, a fluororesin alcohol dispersion which includes fluororesin dispersed in an alcohol dispersion medium, and so on. In particular, aqueous dispersions are often selected for their ease of handling during drying. Examples of fluororesins include polytetrafluoroethylene, tetrafluororethylene-ethylene copolymer, tetrafluoroethylene-hexafluoropropylene copolymer, and so on. As long as the processing liquid saturates the pores inside the gas diffusion layer, there are no limitations on the submersion conditions.

Drying performed after submersion is implemented in a heated condition so that the solvent and so on in the dispersion can be dried quickly. Drying is performed within a temperature range of approximately 50° C. to approximately 130° C., but is more preferably performed within a temperature range of 80-100° C. The drying time is selected appropriately in consideration of the thickness of the gas diffusion layer 2b, the amount of surface treatment (or the amount of surface processing liquid) applied to the gas diffusion layer 2b, and the drying temperature. With regard to workability, the drying time is typically between fifteen and ninety minutes.

Figure 9:
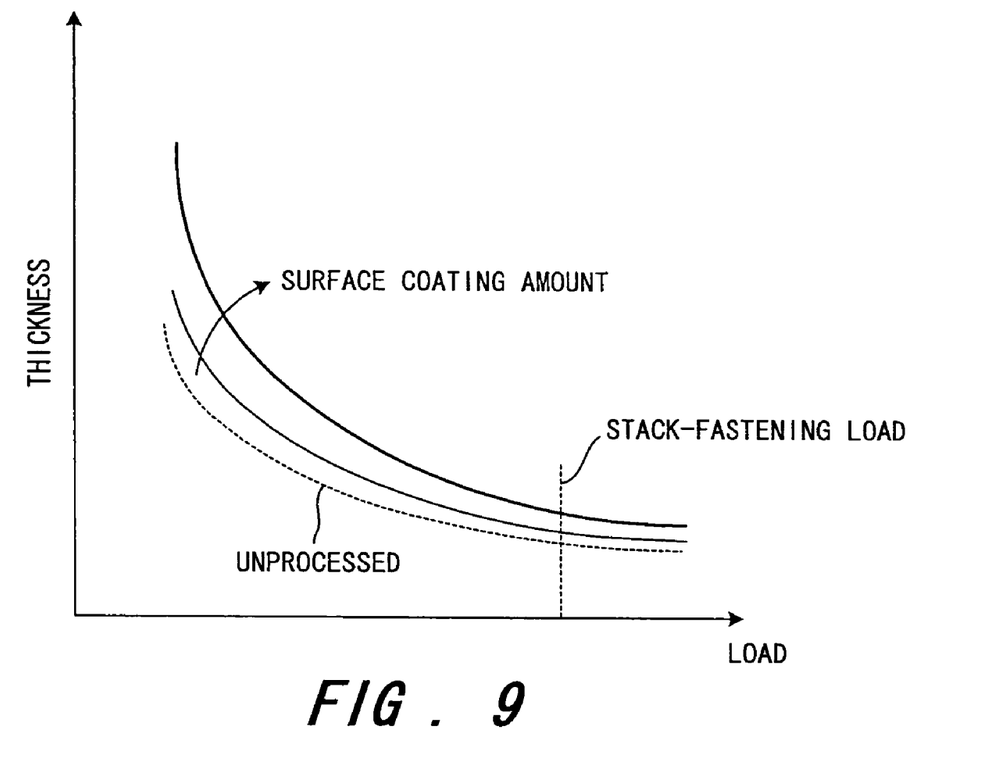
FIG. 9 is a graph showing the relationship between the load (pressure) applied to a surface-processed gas diffusion layer and the thickness of the gas diffusion layer.

FIG. 9 is a graph illustrating the amount of surface treatment applied to the surface-processed gas diffusion layer 2b and the thickness characteristic of the gas diffusion layer 2b in relation to surface pressure. As in FIG. 2, the thickness of the gas diffusion layer decreases as the surface pressure increases, and then converges at a fixed value. As shown in the drawing, the thickness of the gas diffusion layer 2b increases in accordance with the amount of applied surface treatment. Hence under the same stack fastening conditions, the gas diffusion layer 2b tends to be thicker when surface processing is implemented than when unprocessed.

Figure 10:
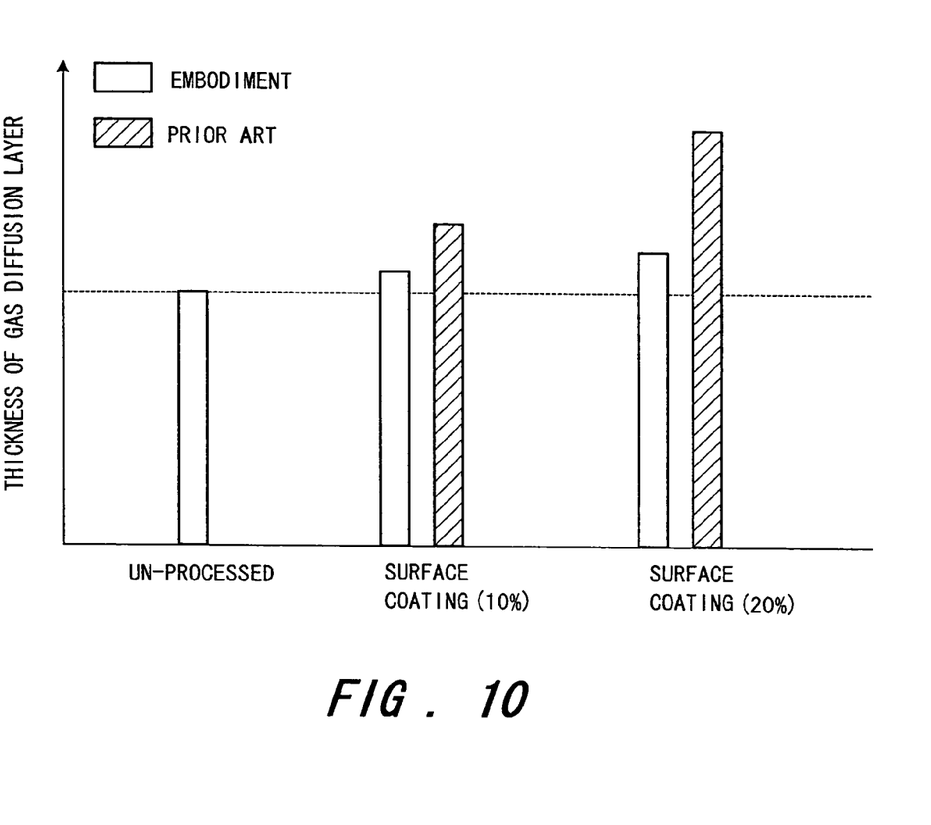
FIG. 10 is a diagram illustrating the effects of this invention.

Referring to FIG. 10, the results of the second embodiment will be described. Here, a non-woven carbon material is used as the gas diffusion layer 2b. A gas diffusion layer that has not undergone surface processing is used as a reference. The samples are gas diffusion layers in which the amount (or weight) of applied surface treatment is approximately 10% and approximately 20% of the amount (weight) of the gas diffusion layer respectively.

The samples were created using a Teflon (Teflon is the brand name of polytetrafluoroethylene) dispersion solution as the surface treatment by submerging the gas diffusion layer 2b into the solution, and then heat-drying the gas diffusion layer 2b. It should be noted that the amount of surface treatment applied to the gas diffusion layer 2b was calculated from the weight of the gas diffusion layer 2b when removed from the Teflon solution.

As shown in FIG. 10, the thickness of the gas diffusion layer 2b of this invention can be reduced below that of the prior art. This is achieved in this invention by applying surface pressure to the gas diffusion layer repeatedly before surface processing to produce a certain degree of plastic deformation. The surface treatment is then filled into the existing spaces. In this invention, surface pressure is applied to the gas diffusion layer repeatedly, and hence little space exists within the diffusion layer. Thus by reducing the required amount of surface treatment coating, the thickness of the gas diffusion layer is reduced when the stack is fastened. Reductions in the amount of applied surface treatment also lead to cost reductions.

A problem that typically arises when surface processing is implemented on the gas diffusion layer 2b to improve the fuel cell performance is that the thickness of the cell increases. According to the manufacturing method of the gas diffusion layer 2b of this invention, however, the gaps between the cells can be reduced when the stack is fastened. As a result, the size of the fuel cell stack can be reduced and the output thereof can be increased, and thus a fuel cell which is suitable for use in a moving body (or vehicle) having limited disposal space is obtained.

A fuel cell stack for use in a moving body requires several hundred cells, and hence even slight reductions in the thickness of each cell enables a great reduction in the overall size of the stack.

The entire contents of Japanese Patent Application P2003-209209 (filed Aug. 28, 2003) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A manufacturing method for a fuel cell stack, wherein the fuel cell stack includes plural cells respectively comprising:
a membrane electrolyte assembly having a polymer electrolyte membrane and two electrodes, the two electrodes, which are constituted by a catalyst electrode layer and a porous gas diffusion layer, supporting the polymer electrolyte membrane from both sides; and
a separator including a gas passage which supplies fuel gas or oxidizer gas to the gas diffusion layer,
said manufacturing method comprising the steps of:
repeating a cycle of applying and removing a load on the gas diffusion layer during manufacture of the gas diffusion layer, while comparing the thickness ($T_{n-1}$) of the gas diffusion layer in a non-loaded state following the end of an (n−1)th cycle with the thickness ($T_n$) of the gas diffusion layer in a non-loaded state following an nth cycle, wherein the cycle is repeated until an amount of change ($T_{n-1}-T_n$) in a thickness of the gas diffusion layer in a non-loaded state before and after the load is applied falls to or below a predetermined value so that the electric resistance of the gas diffusion layer converges at a fixed value;
forming the membrane electrolyte assembly from the gas diffusion layer after the repeating step; and
laminating the cells each having the membrane electrolyte assembly, and then fastening the laminated cells.

2. The manufacturing method for a fuel cell stack as defined in claim 1, wherein a maximum value (Pmax) of a pressure that is produced in the gas diffusion layer when the load is applied is greater than a pressure (Pr) applied to the gas diffusion layer from the separator when the fuel cell stack is fastened.

3. The manufacturing method for a fuel cell stack as defined in claim 1, wherein, when the pressure (Pr) that is applied to the gas diffusion layer from the separator during fastening of the stack is close to a pressure which causes the gas diffusion layer to buckle, the maximum value (Pmax) of the pressure produced in the gas diffusion layer when the load is applied is set to be smaller than the pressure (Pr) applied during fastening of the stack.

4. The manufacturing method for a fuel cell stack as defined in claim 1, wherein the gas diffusion layer is constituted by carbon cloth, and
the maximum value (Pmax) of the pressure applied to the gas diffusion layer during application of the load is smaller than a pressure which causes the carbon cloth to buckle.

5. The manufacturing method for a fuel cell stack as defined in claim 1, wherein the gas diffusion layer is constituted by carbon paper, and
the maximum value (Pmax) of the pressure applied to the gas diffusion layer during application of the load is smaller than a pressure which causes the carbon paper to buckle.

6. The manufacturing method for a fuel cell stack as defined in claim 1, wherein the load is applied to the gas diffusion layer at a predetermined temperature that is higher than room temperature.

7. The manufacturing method for a fuel cell stack as defined in claim 1, wherein the cycle is repeated until a rate of change $(T_{n-1}-T_n)/T_{n-1}\times 100(\%)$ falls to or below a predetermined value.

8. The manufacturing method for a fuel cell stack as defined in claim 7, wherein the predetermined value for the rate of change is less than 10%.

9. The manufacturing method for a fuel cell stack as defined in claim 1, wherein the repeating step comprising: repeating at least two cycles of applying and removing a load on the gas diffusion layer and comparing the thickness of the gas diffusion layer in a non-loaded state before and after the load is first applied.

10. A fuel cell stack product made by the manufacturing method of claim 1.

11. The manufacturing method for a fuel cell stack as defined in claim 1, further comprising the step of implementing surface processing on said gas diffusion layer.

12. The manufacturing method for a fuel cell stack as defined in claim 11, wherein the surface processing is water repellent processing or hydrophilic processing.

13. The manufacturing method for a fuel cell stack as defined in claim 12, wherein the water repellent processing comprises the steps of:
submerging the gas diffusion layer in a water repellent processing liquid, removing the gas diffusion layer from the processing liquid, and drying the gas diffusion layer.

14. The manufacturing method for a fuel cell stack as defined in claim 12, wherein the water repellent processing liquid is a fluororesin aqueous dispersion which includes fluororesin dispersed in an aqueous dispersion medium, or a fluororesin alcohol dispersion which includes fluororesin dispersed in an alcohol dispersion medium.

* * * * *